(12) United States Patent
Rinne et al.

(10) Patent No.: US 6,693,892 B1
(45) Date of Patent: Feb. 17, 2004

(54) METHOD OF CONTROLLING COMMUNICATION RESOURCES

(75) Inventors: Mikko Rinne, Helsinki (FI); Kalle Ahmavaara, Helsinki (FI); Terhi Virtanen, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/491,524

(22) Filed: Jan. 26, 2000

Related U.S. Application Data (63) Continuation of application No. PCT/FI98/00607, filed on Jul. 31, 1998.

(30) Foreign Application Priority Data

Jul. 31, 1997 (FI) .................................................. 973169

(51) Int. Cl.[7] .............................................. H04B 7/212
(52) U.S. Cl. .................... 370/348; 370/329; 370/349
(58) Field of Search ................................ 370/321, 322, 370/323, 324, 337, 347, 348, 442, 352, 353, 354, 355, 376, 329, 330, 336, 349

(56) References Cited

U.S. PATENT DOCUMENTS

| 5,295,140 A | * | 3/1994 | Crisler et al. ............... 370/94.1 |
| 5,377,192 A | * | 12/1994 | Goodings et al. .......... 370/95.3 |
| 5,446,734 A | * | 8/1995 | Goldstein .................. 370/60.1 |
| 5,615,212 A | * | 3/1997 | Ruszczyk et al. ........... 370/433 |

FOREIGN PATENT DOCUMENTS

| DE | 195 36 379 | 4/1997 |
| EP | 0 841 763 | 5/1998 |
| WO | 96/10305 | 4/1996 |
| WO | 97/20444 | 6/1997 |

* cited by examiner

*Primary Examiner*—Alpus H. Hsu
*Assistant Examiner*—Thien Tran
(74) *Attorney, Agent, or Firm*—Squire, Sanders & Dempsey L.L.P.

(57) ABSTRACT

According to the method of the invention, connections are divided into at least two different connection classes according to their requirements for transmission delay. The control system of the base station subsystem maintains a record of the transmission needs of the users logged in different categories and based thereon divides the available radio resources into slots of suitable capacity. For connections with stringent requirements for transmission delay, circuit-switched connections are allocated with a bandwidth which can be controlled dynamically. Then from the resource pool still unassigned after the resource allocation to the circuit-switched connections, a sufficient amount of resources are allocated on a time-limited basis allocation for each allocation period to connections having a higher tolerance for delay so as to accomplish transmission, e.g. of a given amount of data.

28 Claims, 8 Drawing Sheets

METHOD OF CONTROLLING COMMUNICATION RESOURCES

This is a CON of PCT/FI98/00607, filed Jul. 31, 1998.

SCOPE OF THE INVENTION

The present invention relates to a method of controlling communication resources in a communication system, particularly a mobile telephone system.

BACKGROUND OF THE INVENTION

In communication systems such as mobile telephone systems, the system possesses a given capacity of information transfer resources that can be used for establishing connections to the system users. The different types of connections requested by users have widely varying requirements in information transmission quality. For instance, while a voice signal is rather tolerant of transmission errors, it is virtually intolerant of transmission delay. On the other hand, program files to be transferred from one computer to another must not contain a single transfer error, whereas their transfer is fairly tolerant of transmission delay.

Broadly speaking, information transfer techniques can be categorized into circuit-switched and packet-switched methods. In circuit-switched networks, certain continuous communication resources which are de-allocated only at the release instant of the user circuit are allocated for the use of the connection during the establishment step of the connection. By contrast, a plurality of different packet-switching communication protocols in the technology of packet-switched networks are known, whereby the connection established between terminal equipment and a base station is not continuous, but the information is carried instead in the form of packets with sequential transmission which have separating intervals of varying duration. Here, one benefit over circuit-switched networks is attained in that the radio resources required for a given connection are not needlessly reserved when a temporary pause occurs in the information transfer.

In packet-switched networks, the packets serving the information transfer of a number of separate connections utilize the same communication resources which can perform the transmission of a single packet at a time. As a result, the packets must queue for their allocated transmission position in the packet transmission sequence, which causes a greater transmission delay in packet-switched networks than in circuit-switched networks. Generally speaking, it can be said that a circuit-switched connection is advantageously used for connections requiring a short transmission delay, such as voice signals, while a packet-switched network is suitable for connections tolerant of longer transmission delays.

For optimal service of connections of different types, the system should have a dual capability of both flexibly forming short-delay circuit-switched connections and simultaneously serving packet-switched connections with maximum utilization of information transfer resources. One conventional system capable of establishing both circuit-switched and packet-switched connections is a GPRS (General Packet Radio System) system adapted to operate in conjunction with a GSM (Global System for Mobile Communications) system. Here, the resources are allocated both permanently and dynamically between the two systems, whereby the resources allocated to the GSM system are used for establishing circuit-switched connections and the GPRS system resources serve packet-switched connections. However, if the GSM system does not occupy the channel defined by the allocated time slot, due for instance to a silent interval in the voice communication, the unused capacity of the channel cannot be utilized by the GPRS system.

Finnish patent application No. FI 964308, which at the filing date of the present application has not yet been disclosed to the public, is for a method of dividing the resources of the radio communication channel between the base station and the terminal equipment into frames which may be further subdivided into smaller units. Each frame has a two-dimensional structure. The first level of frame subdivision is based on time, which means that each frame is given a certain time duration which may be further subdivided into consecutive time slots. In a preferred embodiment of the invention, each frame contains a constant number of time slots, but the allocation of the time slots may vary from one frame to another. The second level of frame subdivision is based on time, frequency, or code. If the second subdivision level is also time-based, each time slot of a frame is further subdivided into smaller slots. If the second level of frame subdivision is frequency-based, the frame as a whole reserves a given frequency band, from which narrower sub-bands, or frequency channels, can be allocated for each time slot of a frame. When the performance of the second level of frame subdivision is code-based, a certain number of mutually orthogonal codes are allocated to each time slot. Obviously, it is possible when so required to subdivide the slots obtained by-division according to two of these subdivision variables into yet smaller allocation units on the basis of the third subdivision variable. The smallest resource unit that can be allocated from a given frame is called a slot, and an individual slot is always allocated for the sole use of a given connection.

Figure 1:
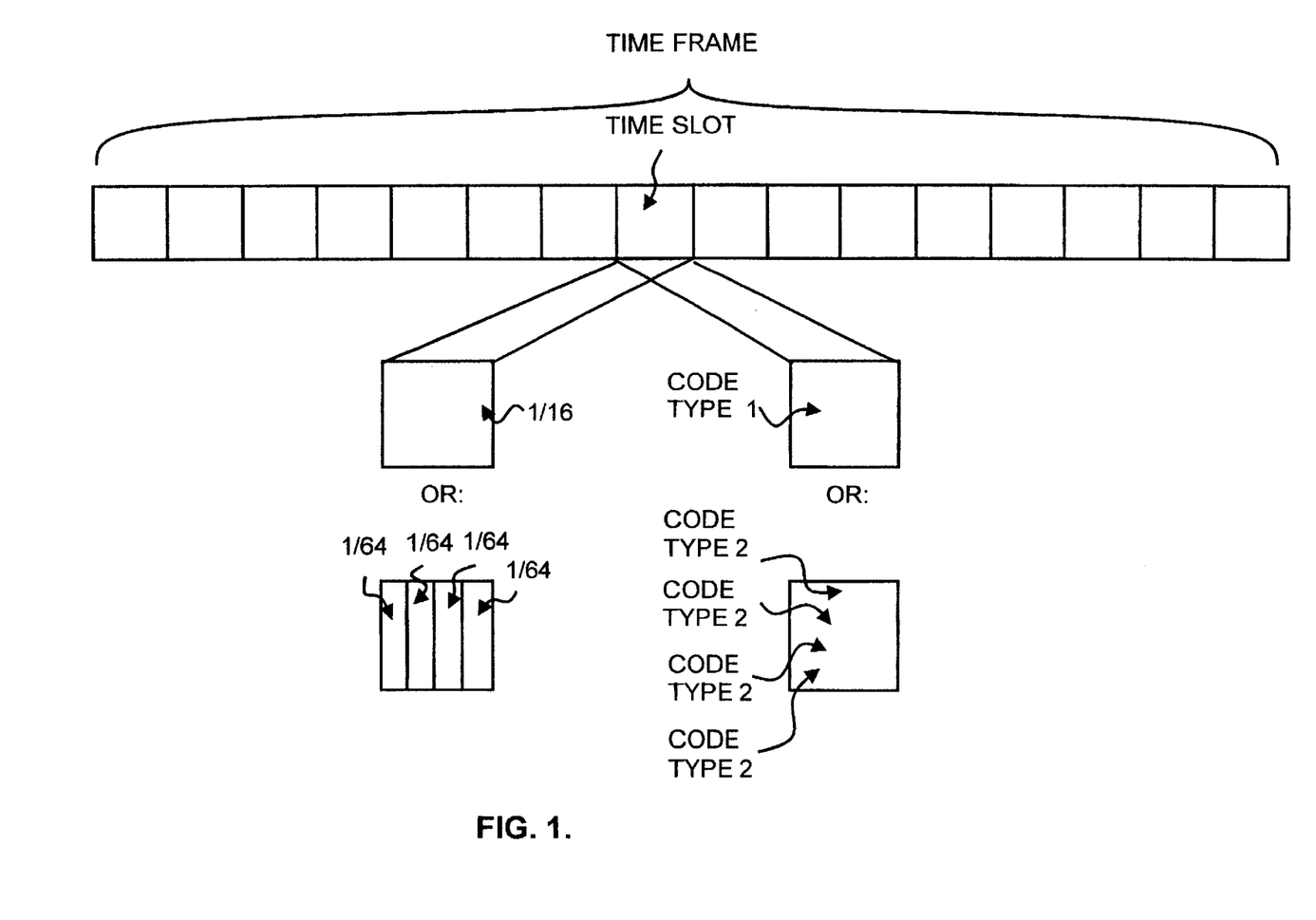
FIG. 1 shows a method for dividing the communication resources into slots according to prior art.

FIG. 1 shows a variation of a two-dimensional frame according to prior art. As noted above, the first dimension of the frame is time, while the other dimension may be time, frequency or code. In the case of FIG. 1, the second subdivision of the frame is either time-based or code-based. The size of the frame in both dimensions must be so determined that the frame meets all other specifications of the system. In the illustrated example, the duration of the frame on the time scale is about 4.615 milliseconds, which is time-divided into eight time slots, each time slot reference numeral 15 having a duration of about 0.577 ms. The frequency bandwidth of the frame is about 1.6 MHz. When the second subdivision is time-based, the smallest contiguous units, or slots, of the frame have a bandwidth of 1.6 MHz, whereby their duration on the time scale may be 0.577 ms, or alternatively 0.114 ms. Reference numeral 16 designates a larger slot with dimensions 0.577 ms×1.6 MHz, and reference numeral 17 designates a smaller slot with dimensions 0.114 ms×1.6 MHz. When the second subdivision is code-based, the slots have a bandwidth of 1.6 MHz with 0.577 ms duration, but varying types of codes are used in the different slots. When code type 1 is used, the time slot can be allocated to only one connection at a time. When code type 2 is used, the same time slot can be utilized by four connections simultaneously. Because the use of a code increases the amount of information to be transferred, the overall quantity of information transferable by code type 2 remains smaller than with code type 1.

Resource allocation using the prior art techniques described above offers efficient facilities for serving the needs of connections of different types. However, there is no known method capable of controlling the allocation of communication resources such as radio resources in a sufficiently flexible and dynamic manner between connections having different requirements.

The object of the present invention is to fulfill this need by means of a method and apparatus described in the appended independent claims.

SUMMARY OF THE INVENTION

The purpose of the invention is to form various kinds of communication services for different types of connections, optimally using a common communication resource.

In the method of the invention, connections are divided into at least two different connection classes according to their requirements for transmission delay. The control system of the base station subsystem maintains a record of the transmission needs of the users logged in the different categories and divides the available radio resources into slots of suitable capacity on the basis of this recorded information.

For connections with stringent requirements regarding transmission delay, circuit-switched connections are allocated with a bandwidth which can be controlled dynamically. Then, from the resource pool still unassigned after resource allocation to the circuit-switched connections, a sufficient amount of resources per allocation period are allocated on a time-limited basis to connections having a higher tolerance for delay so as to accomplish transmission, such as the transmission of a given amount of data. The allocation period comprises one or more time frames. Resources in the different transmission directions are allocated independently of each other.

According to one embodiment, the class of connections with a higher tolerance for delay is further divided into at least two subclasses according to the quantity of information to be transferred. For connections requiring only low volumes of information, a traffic channel is allocated for a limited time which is sufficient to transmit a given amount of data. For connections requiring the transference of high volumes of information a reservation identity RID is allocated. The RID is then used to signal the allocation of communications resources of subsequent allocation periods.

BRIEF DESCRIPTION OF THE DRAWINGS

The invention is described in greater detail with reference to the appended drawings in which

FIG. 5 shows signaling transfer for the allocation of radio resources for a downlink real time for;

DETAILED DESCRIPTION OF THE INVENTION

We shall now study an exemplary implementation of the invention. Here, the invention is described in connection with the slot structure shown in FIG. 1. It must, however, be noted that the use of the method according to the invention is not limited to this application. The only restriction of the invention is that the resources are divisible into slots, the smallest allocable units, and that there are at least two sizes of slots. The division of communications resources is not necessarily according to time, such as shown in FIG. 1. Another example of possible division is code-frequency division.

Figure 2:
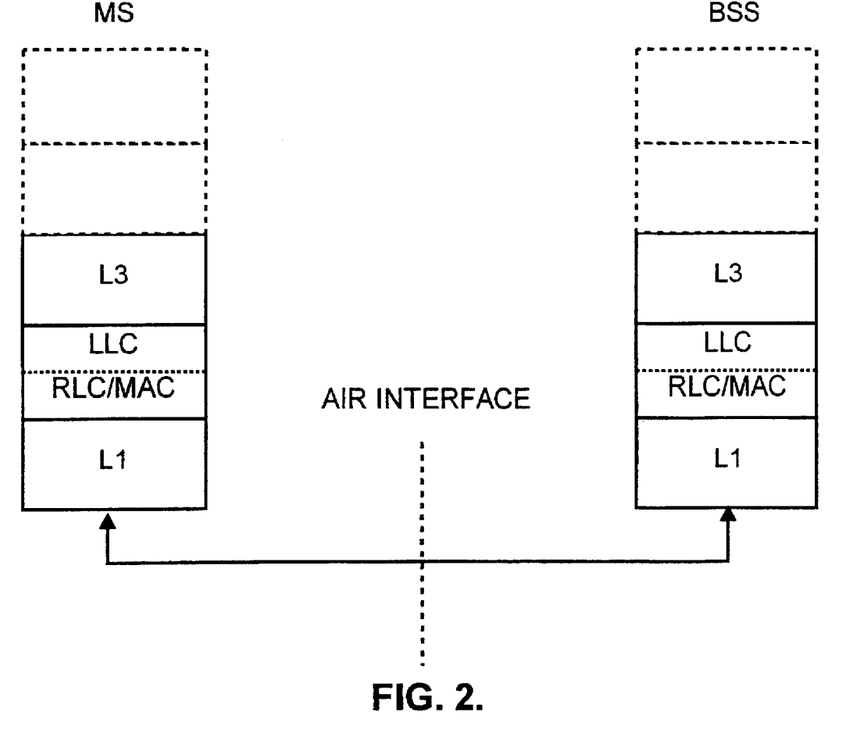
FIG. 2 shows a protocol arrangement capable of implementing the functionality requirements according to the invention.

First, a preferred protocol arrangement capable of implementing the functionality requirements according to the invention is discussed. Referring to FIG. 2, a protocol stack is shown controlling the traffic at the radio interface of a mobile telephone system. Implemented in a base station system BSS and a mobile station MS, the diagram illustrates the physical layer L1 (Layer 1), the link; layer L2 formed by the RLC/MAC (Radio Link Control/Medium Access Control) and LLC (Logical Link Control) sublayers, and the network layer L3. While a number of other layers above the network layer are defined, their detailed discussion can be omitted here as irrelevant to the present invention.

The physical layer encodes, interleaves, and modulates the signal to be sent on the radio path. Respectively, the same layer disassembles the modulation, interleaving and channel coding of the received signal which has been transmitted over the radio path.

The MAC sublayer above the physical layer performs the control and allocation of radio resources with the required signaling, as well as the mapping of the logical channels on the physical channels. The control of the radio resources takes place in the base station subsystem located on the fixed network side.

The RLC unit; which is assigned on a per connection basis for each connection separately within the MAC layer, serves to maintain the quality of service (QoS) negotiated for the connection. In order to maintain quality at the negotiated level, the RLC unit selects for the connection a correct transmission format (RT/NRT) which contains error correction, the selection of the depth of the interleave and modulation method, as well as the control of retransmission for defective frames.

LLC establishes over the radio path a logical connection which utilizes the services offered by the underlying RLC/MAC layer. From the information received from the overlying layers as a result of transmission over the radio path, LLC forms LLC frames suitable for forwarding by the RLC layer, and in the opposite direction, LLC respectively combines the information carried over the radio path by the RLC layer in LLC frames into a format suitable for forwarding to the overlying layers.

We shall next study the layer 2 functions and especially the RLC/MAC layer more closely.

The overall layer 2 function is to realize radio bearers for layer 3, connections with respect to their QoS objectives. The first radio bearer, called the initial radio bearer, is mainly used to transport the radio network layer (RNL)

signaling, plus any messages destined for the core network. Other radio bearers are used to transport user data and network signaling. The initial radio bearer is maintained as long as other radio bearers have data to transfer. It is the last one to be released.

The set-up procedure of the initial radio bearer is triggered by layer 3, either after the reception of a paging message or when the MS has a message for the core network on the mobile station side. This procedure is different from the one used to establish other radio bearers in that the set-up request is sent on a common uplink channel in the format of a short burst, the timing advance being unknown. The network allocates in return an MAC level identity to the MS. The procedure deals with collision, and layer 3 resolves contention between mobiles in order to guarantee that the MAC level identity is allocated to one and only one mobile. The MAC level identity is retained as long as the initial radio bearer is maintained. It is valid inside a given cell and has to be exchanged at each intercell cell handover.

The messages used to establish other radio bearers are layer 3 messages transported on the initial radio bearer.

Although RLC/MAC has been defined as one layer which has one interface to the physical layer and one interface to the LLC layer, functions of the RLC part and MAC part can be separated. Therefore, layer 2 is composed of three types of protocol entities. The LLC and RLC entities are created in connection with a radio bearer and their function is to guarantee the negotiated QoS for the connection using the radio bearer. The mobile MAC and network MAC entities are shared by all the radio bearers and their main task is to split the radio resource dynamically between the bearers.

Each time a radio bearer is established, two RLCs (one in the MS and one in the network) are created by the management plane to handle the Service Data Unit SDU coming from the LLCs connected with the bearer. Their operating parameters are selected as a function of the QoS to be provided. The first task of the RLCs is to segment the SDU coming from the LLC. The second task is to meet the QoS objectives that were assigned to them. For this purpose, they have elaborate control mechanisms at their disposal in order to deal with fluctuations in radio link quality.

The RLC protocol is located in the BSS and the mobile station. It has two operating modes, the first one to cater for real time connections requiring a short transmission delay and the second one to cater for non-realtime connections having a higher tolerance for transmission delay. The RT mode employs power control and link adaptation mechanisms. The NRT mode uses power control and retransmission procedures.

In the RT mode, the source RLC is in charge of splitting the LLC flow to the traffic channels (TCHs) allocated to the radio bearer. The RLC deals with link adaptation and therefore signals resource change requests to MACs in order to adapt to traffic or radio link quality variations. The transmission format (channel-coding, interleaving, and modulation) for the bearer is selected from among a limited set of options. The actual coding rate can, however, be adjusted separately for each TCH. The RLC segments the LLC data into RLC PDUs in accordance with the transmission format, optionally computes a CRC (Cyclic Redundancy Code), and then delivers the PDU to the physical layer for transmission. The receiving RLC checks the CRC, if there is one, and signals the CRC check result to the MAC. The RLC assembles the PDUs received and delivers the resulting SDU to the LLC.

In the NRT mode, the source RLC indicates the size of the data to be transmitted to the MAC layer. The transmission format to be used is agreed on at the bearer set-up. The RLC deduces from this format the adapted segmentation and delivers Protocol Data Units PDU to layer 1 when requested by the MAC, i.e. when resources are allocated to the radio bearer by the network. The sink RLC checks the CRC and alerts the MAC when a corrupted PDU is received. It assembles the correct PDUs and delivers SDU to LLC.

One MAC entity per mobile manages all the radio bearers established by the mobile. The peer MAC in the network manages all the radio bearers of one cell. MAC messages are composed of a data field and a CRC field. The data field is used to transport MAC signaling exclusively. The MAC entity is not crossed by data flow coming from or destined for-upper layers.

MAC entities are essentially in charge of allocating and releasing TCHs to the radio bearer:

For RT radio bearers used for connections sensitive to transmission delay, the allocation mechanism is a circuit-switched type, i.e. the TCH allocation is valid until a release procedure has been executed.

For NRT radio bearers used for connections having a higher tolerance for transmission delay, the allocation mechanism is a packet-switched type, i.e. the allocation is only valid during the allocation period. This mechanism allows speedy adaptation to load conditions because resources are not allocated for an indeterminate period of time. Furthermore, the MACs handle retransmission signaling when an RLC PDU is received with a corrupted CRC. This retransmission mechanism is able to adapt to the capabilities of the MS.

Figure 3A:
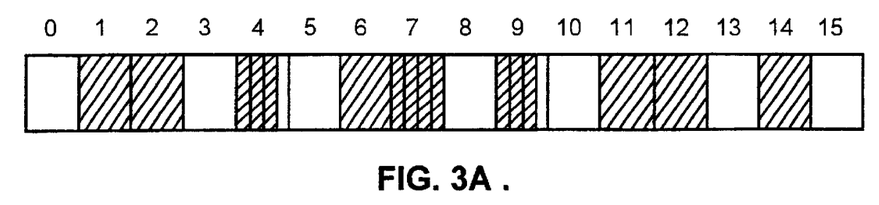
FIGS. 3A, 3B and 3C each show a reservation table of a time frame.
Figure 3B:
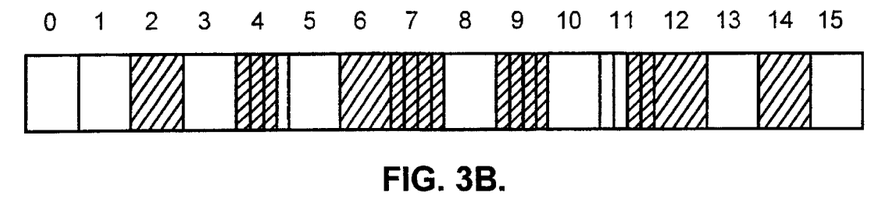
Figure 3C:
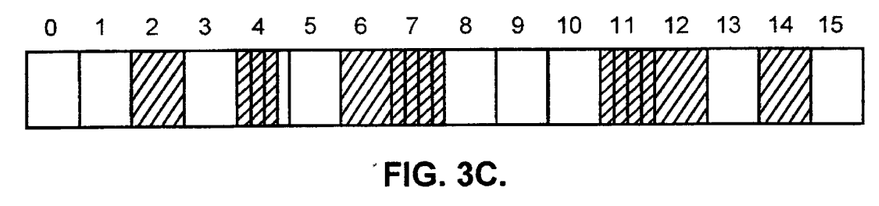

The base station, subsystem (or a corresponding arrangement) maintains a reservation table, which is advantageously compatible with the size of the allocation period, and which indicates the size of each slot and the reservation status, as well as other possible slot-specific parameters in the allocation period. The contents of such a reservation table at three different moments are shown in FIGS. 3A, 3B and 3C. In the reservation table of FIG. 3A, time slots 1, 2, 6, 11, 12 and 14 of the frame are allocated into $\frac{1}{16}$ slots which are remained undivided. Time slots 4, 7 and 9 are divided into smaller $\frac{1}{64}$ slots, and their resources are allocated for the use of connections of lower data transfer rate requirements. The reservation table contains information on the reservation status of physical channels only, and both the character and delay requirements of connections are of no relevance here.

FIG. 3B illustrates the time frame of the next consecutive allocation period. As compared to the time frame of FIG. 3A, the resources of time slots 1 and 11 are shown released. Additionally, it can be seen that the layer responsible for the allocation of the radio resources has found the number of connections requesting the $\frac{1}{64}$ slots to be so high as to justify the subdivision of time slot 11 into $\frac{1}{64}$ slots.

In the case of FIG. 3C, the number of connections requesting a lower data transfer rate has dropped, thus permitting the unit serving the reservation of radio resources to release all the $\frac{1}{64}$ slots of time slot 9.

It must be noted that the reservation is made on an allocation period basis, and the reserved channel does not necessarily have to include slots from every time frame of the allocation period. Therefore, all the time frames of an allocation period are not necessarily identical.

Prior to the reservation of a slot for the use of a new connection by the unit responsible for maintaining the reservation table and for subdividing the time slots into slots, some of the important criteria to be evaluated are the traffic situation, the information category (e.g., voice, video, data, etc.) of the new connection to be established, the priority class to be determined on the basis of the new connection (e.g. ordinary call, distress call), the overall transmission power level depending on the traffic situation, and the type of communication connection (e.g., realtime or non-realtime). Further criteria of the more advanced type include the interference sensitivity and the required transmission power of a certain slot.

The MAC sends the data units to be transmitted to layer 1 and reads those received from layer 1. It is also responsible for clearing the transmission and reception buffers. Further, the MAC decides when the decoding attempt of burst data is to be performed. The decoding is performed at layer 1 in response to a decoding request L1-Decode Request from the RLC/MAC layer.

In the RT operation mode, the burst data can be removed from the buffer as soon as it has been transmitted. On the receiving side, data can be removed from the buffer when the data unit has been decoded and passed to the RLC/MAC layer.

In the NRT operation, the data unit can be removed from the transmission buffers when it has been acknowledged. On the receiving side, data can be removed from the reception buffers when the data unit has been decoded and passed to the RLC/MAC and when the quality of the data unit has been judged sufficient. The quality can be determined by using a CRC check for the data unit, for example. The data unit is removed by layer 1 in response to a request L1 Buffer Clear Request from the RLC/MAC layer pointing to the bursts forming the data unit. If the RLC/MAC level ARQ (Automatic Repeat on reQuest) type of error correction is not used, the data unit can be cleared from the reception buffer immediately after decoding. If the RLC/MAC level ARQ is used, the data unit is cleared from the reception buffer when the RLC signals that the quality of the data unit is sufficient (i.e. when the CRC check shows no errors).

On the transmission side, the RT data units can be cleared from the buffer at the end of the interleaving period. The NRT data units are cleared according to the acknowledgments received from the receiver.

We shall next study the establishment of connections in the presented system.

To allocated a connection which is connected with a control channel or to inform the MS about a new location of a common control channel, the BSS-MAC uses a CTRL-Capacity Allocation (CTRL-CA) message. The message comprises an identifier identifying the connection, information about the physical channel allocated, and the type of control channel. The CTRL-Capacity Allocation Acknowledgment (CTRL-CAA) message is used by the MS to acknowledge the CTRL-Capacity Allocation. If the CTRL-CAA is not received by the BSS within a predefined time period, the status of the allocation must be solved by the CTRL-CA or the CTRL-Capacity Deallocation (CTRL-CD) until the CTRL-CAA/CTRL-CDA has been received (CTRL-CDA=CTRL-Capacity Deallocation Acknowledgment).

The traffic channel resources can be allocated in different transmission directions (uplink/downlink) independently of each other, based purely on the transmission needs. The procedures used for allocating the traffic channels depend on the operation mode and will be examined next.

In the method according to the invention, the allocation of radio resources occurs basically in the same manner for both the realtime and non-realtime services: slots are allocated from the time frames for both needs. Information transfer over the radio path varies depending on the type of service, and whether it is realtime or non-realtime. Examples of applications requesting realtime or virtual realtime service are speech transmission in packets and a bidirectional video connection. In the simulation tests of the method according to the invention, the requirements for speech transmission between a base station and the terminal equipment were set at a max. allowable bit error rate (BER) of $10^{-3}$ and at a max. allowable transfer delay of 30 ms. In a video connection needed for a bidirectional video connection, corresponding limits are set at $10^{-6}$ and 100 ms, wherein the longer delay is due to the time interleaving of the video information to be transferred. These services utilize an error correction of the FEC (Forward Error Correction) type and a radio resource reservation scheme to be described later in more detail. A non-realtime type of service would be a file transfer during a conventional Internet connection, for example. This application uses packet-switched data transfer and an ARQ type of error correction protocol.

RT Operating Mode

An important characteristic of the RT operating mode is that it allocates the TCH for an indeterminate period of time. A release procedure is necessary to liberate the TCH. More than one radio bearer cannot be multiplexed on one TCH. The MAC uses an addressing scheme that allows the TCH to have a very precise granularity so that multiplexing is not necessary. (One TCH is mapped onto one physical channel. This mapping can be in each time frame, every second time frame, and soon up to every 128th time frame).

Network Initiated Procedure for RT Operating Mode

Network initiated procedures are for handling radio condition variations for uplink radio bearers and bit rate variations for downlink radio bearers. A signaling chart showing the procedure of allocating, changing the allocation, and deallocating an RT bearer is given in FIG. 4.

Figure 4:
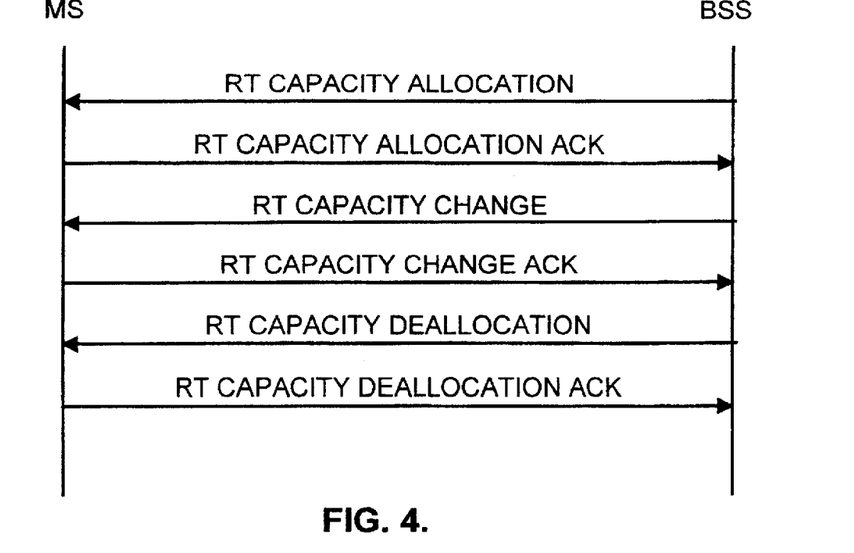
FIG. 4 shows signaling transfer for the allocation of radio resources for an uplink real time connection.

There are three types of commands: the allocation of a TCH, the exchange of one TCH for another, and the de-allocation of a TCH. For example, whenever a network RLC asks the network MAC for more resources, the network MAC alerts the peer MAC with an RT Capacity Allocation (RT-CA) message. This message indicates the radio bearer concerned and the TCH allocated. It is acknowledged by, an RT Capacity Allocation Acknowledgment (RT-CAA) message. The RT Capacity Change (RT-CC) and RT Capacity Deallocation (RT-CD) messages and their associated acknowledgments are used to exchange and liberate TCHs.

An acknowledgment message (e.g. RT-CAA, RT Capacity Deallocation Acknowledgment, RT Capacity Change Acknowledgment) can be substituted by the MS-MAC with any other uplink MAC message. In this case the cyclic redundancy code (CRC) for checking message integrity is calculated from the combined data of the DL-MAC message to be acknowledged and the substituting UL-MAC message to be transmitted.

An RT-CC message has fields for the old and the new TCH allocation. The MS or radio bearer concerned need not be identified, because they are identifiable from the old TCH. An RT-CD message indicates that the TCH has been deallocated. All the RT messages mentioned can use a message discriminator field to separate them from other signaling messages. All messages except the RT-CC type indicate the radio bearer concerned and also the MS, unless this is identifiable from the applied signaling channel.

Mobile Initiated Procedure for RT Operating Mode

Figure 5:
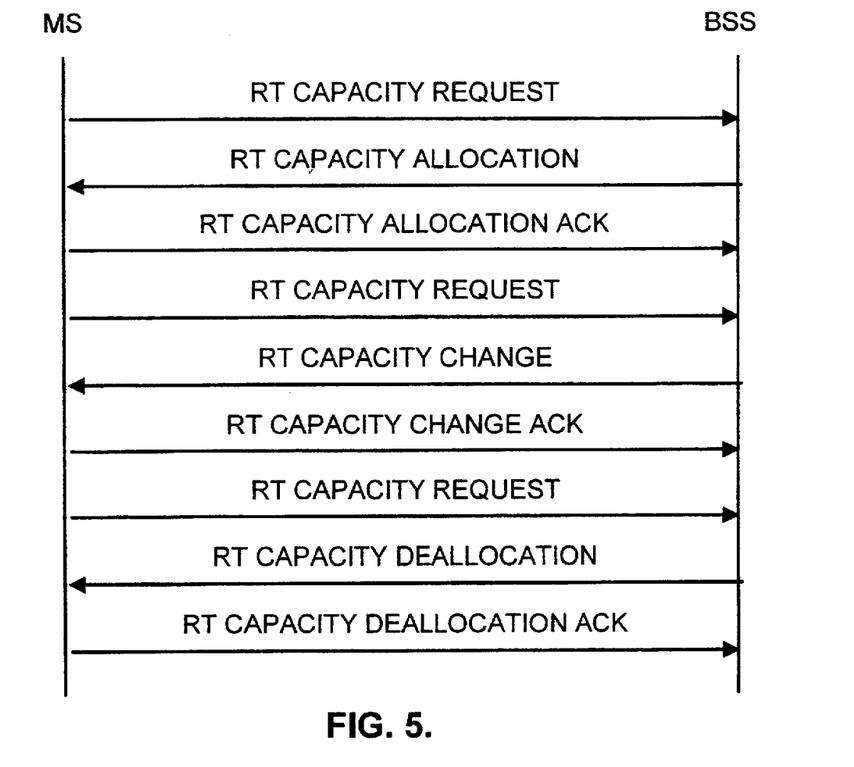

The mobile initiated procedures are for handling radio condition variations for downlink radio bearers and bit rate variations for uplink radio bearers. A signaling chart is given in FIG. 5 showing the procedure for allocating, changing the allocation, and deallocating an RT bearer.

Whenever a mobile RLC requests its MAC for a resource change, the MAC interprets the request as an RT Capacity Request (RT-CR) MAC message. This message includes an indication of the needed data transmission rate and identification of the message type, the radio bearer concerned, and the requesting mobile station, unless this is already identifiable from the applied signaling channel. The capacity allocation procedure is similar to the mobile initiated procedure as described in the network initiated procedure. However, channel allocation is initiated by an RT-CR message and not by a BSS RLC request.

Connections requesting realtime services may require a plurality of simultaneous uplink and downlink channels between the subscriber terminal equipment and the base station. Such simultaneous channels are called parallel connections. According to a preferred embodiment of the invention, a certain temporary logical identifier is assigned to the terminal equipment. This distinguishes the equipment from other terminal equipment communicating with the same base station subsystem. To distinguish between parallel connections, a short additional identifier (e.g., with a length of 4 bits) can be used.

NRT Operating Mode

In the NRT operating mode, the network knows the amount of data to transmit. The TCHs are allocated for each allocation period separately. The NRT operation mode can be divided into a high bitrate NRT used for high volumes of data and a medium bitrate NRT used for short or infrequent data transmissions.

For the high bitrate NRT only $1/16^{th}$ of the physical channels are used and the allocation period is fixed at two TDMA-frames. A data unit designates the two $1/16$ bursts related to a TCH during one allocation period. Because the network has to announce the TCHs divided among the different NRT bearers for each allocation period, each active RLC is allocated a short Reservation Identity (noted RID) at the beginning of its source activity. This identity is valid until it is released by the BSS MAC.

For a medium bitrate NRT, all TCH types can be allocated and the allocation period length is variable (2–32 TDMA frames). Allocations for a medium bitrate NRT user are announced for each TCH separately and normal MAC and RLC identities are used.

Downlink High Bitrate NRT Allocation and Transmission

Figure 6:
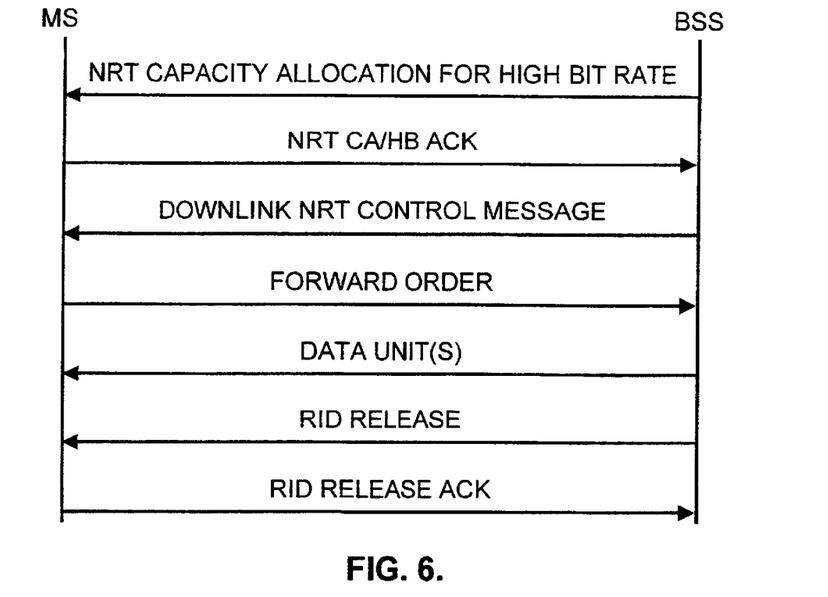
FIG. 6 shows signaling transfer for the allocation of radio resources for an uplink non-real time for for a high bit rate.

The allocation of resources and the transmission of data in down-link high bitrate NRT connections is shown in FIG. 6. When the source of a downlink bearer activates and the BSS MAC decides to use the high bitrate NRT capacity, the network MAC sends a High Bitrate NRT Capacity Allocation message to the MS concerned, including a message discriminator, the RID, a bearer reference, and an MS identifier, if these are not identifiable from the channel. The message points to a pair of logical channels (the NRT Control Channel for Downlink Traffic, or DNCCH and the Forward Order Channel FOCH) as well. The location of a fixed DNCCH can be expressed as a carrier number, whereas the FOCH is given as a channel address. The mobile acknowledges the HB NRT-CA with an HB NRT Capacity Allocation Acknowledgment message.

The mobile MAC entity is now required to listen to the DNCCH. The splitting of the TCHs among the RIDs is announced for each allocation period in a Downlink NRT Control message on the DNCCH. The mobiles indicate the list of data units that should be sent by the BSS in a Forward Order message. This message is sent on the Forward Order Channel FOCH, a common channel shared by several mobiles. The scheduling of FOCH usage is announced on the DNCCH.

The forward order (FO) message transmitted on the FOCH includes an FO window and a list of NRT units to be transmitted. The FO window points to the start of unacknowledged data and the list is a binary word that indicates each ordered NRT unit with a 1-digit.

The downlink control (DNC) message transmitted on the DNCCH consists of a TCH list and a TCH and FOS (Forward Order Schedule) Scheduling list. The TCH list is a binary word whose length equals the number of possible transmission units during one allocation period, e.g. 16 for a 16-slot frame. A 1-digit in the list indicates that the corresponding resource is allocated for NRT use. The scheduling list indicates each RID that will receive data, whether or not they have permission to use their respective FO channels and in which of the resources reported in the TCH list each RID receives data.

After all the data has been transferred, the NRT connection is released when the MS is sent an RID Release message, which releases the RID used in the connection. The mobile station acknowledges the message by sending the BSS MAC an RID Release acknowledgment message.

Uplink High Bitrate NRT Allocation and Transmission

Figure 7:
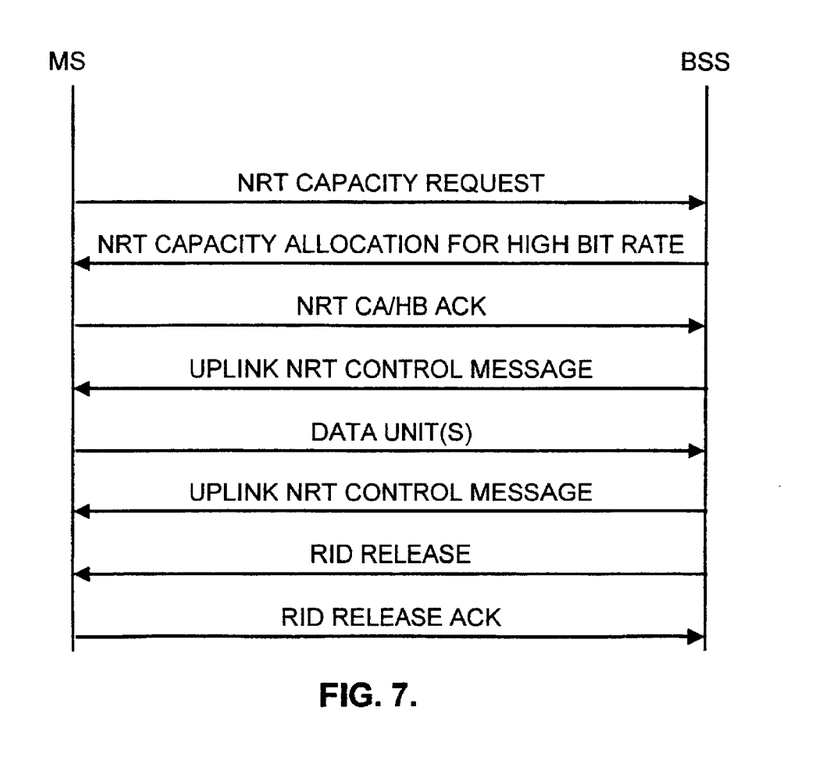
FIG. 7 shows signaling transfer for the allocation of radio resources for a downlink non-real time for for a high bit rate.

When the NRT source of an uplink bearer activates, the mobile MAC sends an NRT Capacity Request message to the network, indicating the bearer reference and the data amount to be transmitted (see. FIG. 7). Depending on the requested data amount and the load situation in the cell, the BSS MAC allocates either high or medium bitrate NRT capacity to the MS. In the case of high bitrate allocation, the BSS MAC allocates in return an RID and announces the granted data amount in an HB NRT Capacity Allocation message. The message also points to a logical channel UNCCH (NRT Control Channel for Uplink traffic). Finally, the mobile sends an acknowledgment with an NRT Capacity Allocation Acknowledgment message.

The splitting of TCHs between RIDs for each allocation period is announced by the BSS MAC in an Uplink NRT Control message on the UNCCH. The Uplink NRT Control message also indicates the data units that should be sent through the allocated TCHs.

The Retransmission Procedures for High Bitrate NRT

The NRT mode uses a very flexible signaling procedure which allows the use of various retransmission schemes. Since in any case all NRT data is ordered by the receiver, the algorithm on which the order is based need not be the same for all MSs. Depending on the capabilities of the mobile station, a more or less sophisticated retransmission scheme can be selected at bearer set-up. The simpliest ARQ algorithm could be the normal type 1 ARQ, according to which the RLC-CRC is checked and, depending on the findings, the PDU is either accepted or discarded and a request for retransmission is sent.

The highest efficiency is, however, assumed to be achieved with the following type II hybrid ARQ scheme: an RLC-PDU (RLC Packet Data Unit) is coded in such a way that after the first part of it has been transmitted, it is already possible to decode the data. If the decoding is not successful, then the rest of the coded data (containing redundancy of the first part) is transmitted. If the PDU decoding is not successful after having transmitted all the data, then a request is made for retransmission of some data units, preferably the ones with lowest reception quality, until the decoding is successful.

Medium Bitrate NRT Transmissions

Figure 8:
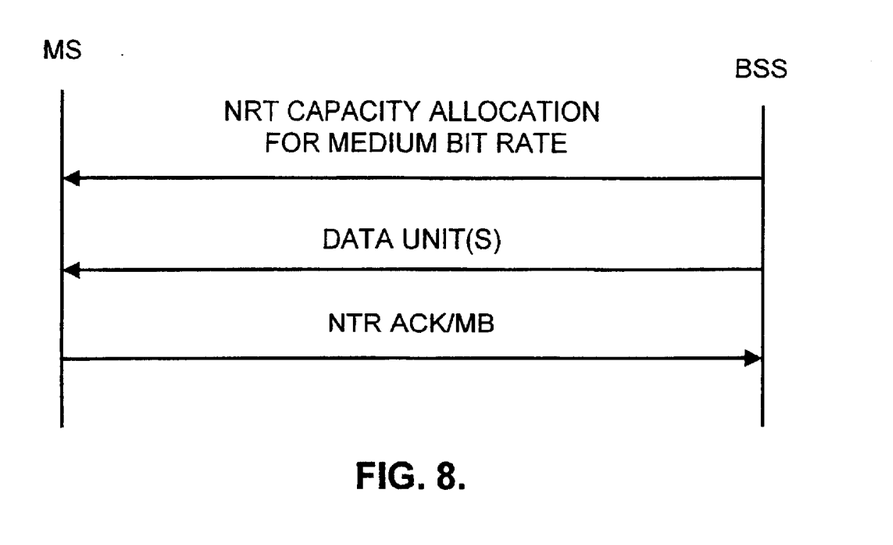
FIG. 8 shows signaling transfer for the allocation of radio resources for an uplink non-real time for for a medium bit rate.
Figure 9:
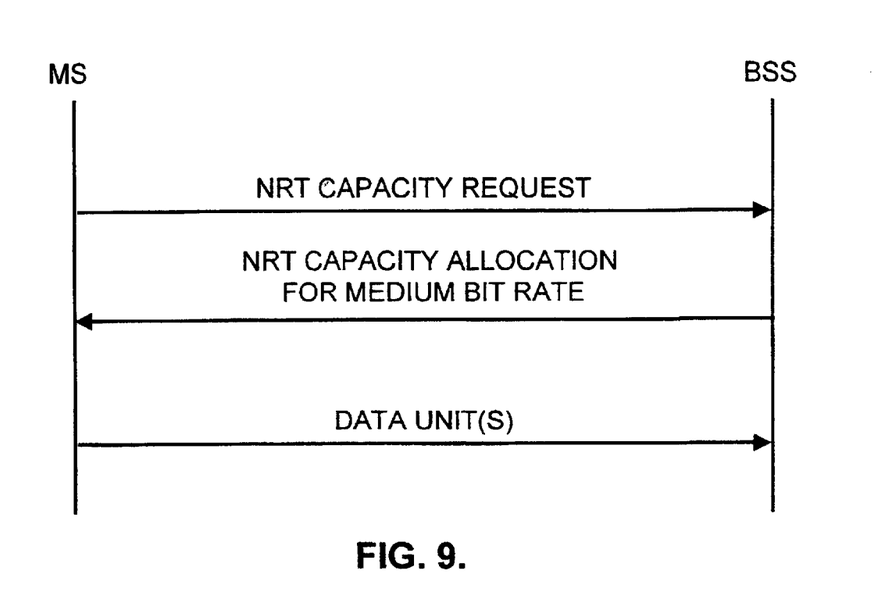
FIG. 9 shows signaling transfer for the allocation of radio resources for a downlink non-real time for for a medium bit rate.

Whether the medium bitrate allocation is initiated by a BSS RLC request or by a MS MAC NRT Capacity request, the procedure is almost the same. The BSS MAC sends a Medium Bitrate NRT Capacity Allocation (MB NRT-CA) message containing the MAC-ID, the Bearer-ID, the TCH address, the length of the allocation period, and an allocation identifier. The downlink medium bitrate NRT transmission is shown in FIG. 8, and the uplink medium bitrate NRT transmission is shown in FIG. 9. The transmitting side transmits the NRT data accordingly. In the case of downlink NRT transmission, the MS acknowledges the data received when the decoding of it has been successful. If the decoding is not successful for either uplink or downlink transmission, the BSS MAC sends an MB NRT-CA message with the same allocation identifier, and the transmitter retransmits the same data. This procedure is repeated until the decoding is judged to be successful.

Figure 10:
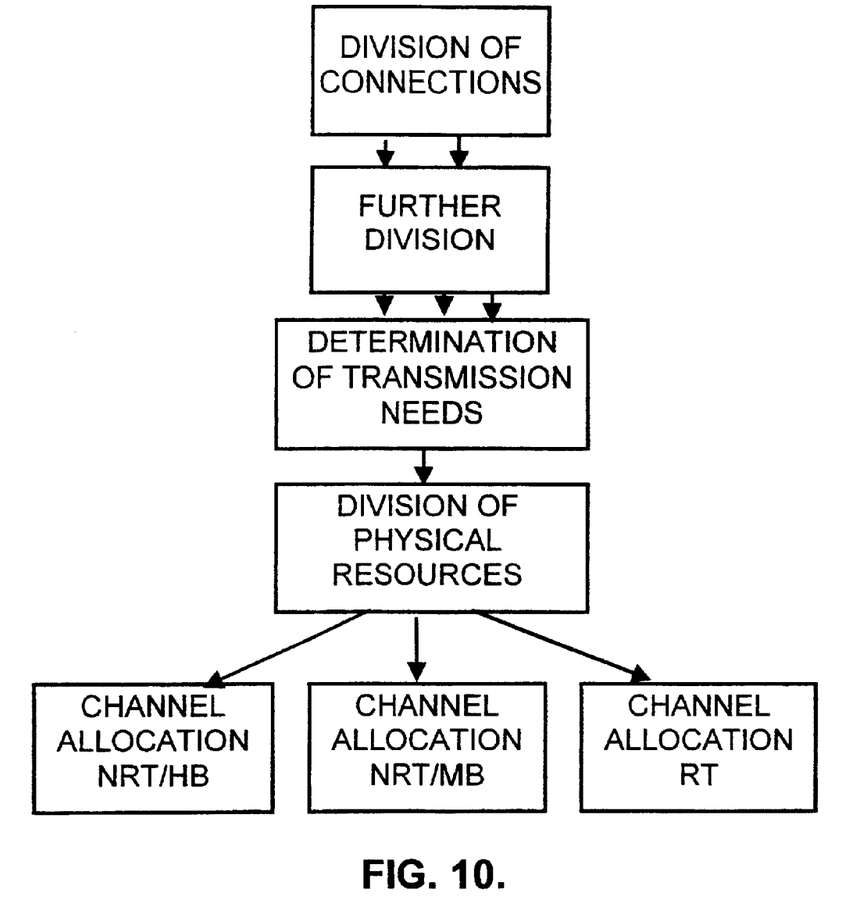
FIG. 10 shows the functions needed for controlling the communications resources in the-uplink direction.
Figure 11:
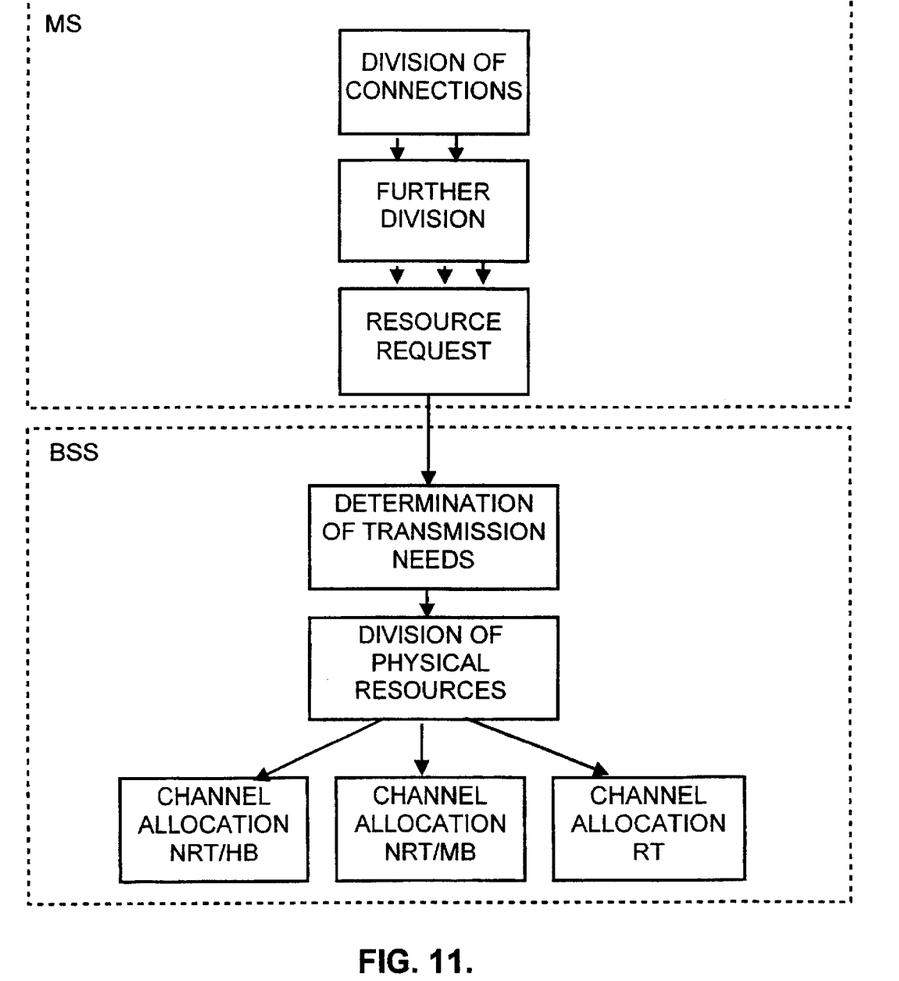
FIG. 11 shows the functions needed for controlling the communications resources in the downlink direction.

To sum up, the means needed in the BS and in the MS are shown in FIGS. 10 and 11. FIG. 10 shows the means needed in the BSS for the allocation process presented for downlink channels. The means comprises

- first connection dividing means for dividing the connections according to their delay requirements into at least two classes. (This is implemented in protocols of layer 3 or above. The rest of the means are implemented in layer 2),
- second connection dividing means responsive to the first connection dividing means for dividing the NRT connections further into NRT/HB and NRT/MB-type connections,
- communication need determining means responsive to the first and the second connection divider for determining the communication needs,
- resource dividing means responsive to the communication need determining means for dividing the communication resources into slots based on the communication needs in different communication classes, and
- allocation means responsive to the resource dividing means and the communication need determining means for allocating different types of channels, i.e. RT, NRT/HB or NRT/MB channels for communications of different classes.

FIG. 11 shows the means needed in the MS and in the BSS for the presented uplink channel allocation. In the MS, the means comprises

- first connection dividing means for dividing the connections according to their delay requirements into at least two classes (This is implemented in protocols of layer 3 or above, the remaining means being implemented in layer 2),
- second connection dividing means responsive to the first connection dividing means for dividing the NRT connections further into NRT/HB and NRT/MB-type connections,
- requesting means responsive to the first and second connection dividing means for requesting resources for different types of connections.

In the BSS, the means comprises

- communication need determining means responsive to the requesting means of the mobile station for determining the communication needs,
- resource dividing means responsive to the communication need determining means for dividing the communication resources into slots based on the communication needs in different communication classes, and
- allocation means responsive to the resource dividing means and the communication need determining means for allocating different types of channels, i.e. RT, NRT/ HB or NRT/MB channels for communications of different classes.

The BSS generally comprises base stations BS and a base station controller BSC, and the means presented can be implemented in either of these network elements. The means can be distributed between the BS and the BSC as well.

In non-realtime connections the same principle of parallel connections can be applied that was explained above in the description of realtime services.

The MAC layer also deals with timing advance (TA) management. This is used to align the transmission timing of a mobile so that the timing closely matches the slot boundaries of the base station with which the mobile is communicating, thus compensating for transmission path delay. The timing advance is managed for each MS. Finally, the MAC provides signaling to control transmission power levels in both directions. This control is made for each radio bearer with an option to adjust the power level of each TCH.

The MS has to transmit periodically in order to provide BSS information needed to maintain the TA. If the MS has nothing to transmit, then a specific Timing Advance Probe (TAP) message can be sent.

In order to administer a dynamic channel assignment on behalf of the MS supporting multiple bearers, a BS-MAC must maintain a record of which physical channels are allocated to all of its bearers for transmission and reception to each MS. This record can be used as a basis for combining the time alignment measurements (made by layer 1) for all MS bearers to form a single estimate of time correction for the MS. Consequently, the BS-MAC (or a process associated with the BS-MAC) will continuously monitor the timing of an MS alignment based on measurements reported by layer 1.

If needed, the BS-MAC transmits a Timing Adjustment Correction (TAC) message which contains a TA correction to be applied to all the bursts transmitted. A TAC message can be transmitted through a common control channel such as Forward Access channel FACH used for broadcasting MAC-layer messages or a dedicated control channel such as the SDCCH (Stand-alone Dedicated Control Channel) or the FACCH (Fast Associated Control Channel).

The MS may stop the transmission of TA probes and then the MS will forfeit the time alignment. Such an MS seeking to start transmission to the BSS again has to send a TAP message in an access burst on the S-RACH. In response to the probe, the BSS will transmit a TAC message.

For slow power control, the Power Control (PC) message can be transmitted on an FACH, an N-RACH, or on any DCCH. For optional fast power control, the use of an FACCH, an SDCCH, or an FACH is inappropriate for the transfer of power level reports. Instead, a Public Power Control Channel PWCCH is adopted. This requires one $\frac{1}{64}$ time slot per frame and indicates the differential power setting to be applied. It has the advantage that it can support unidirectional bearers or bearers operating a DTX, but, it has the disadvantage that mobiles must be able to monitor a broadcast for every frame.

When adaptive antennas are used, the MS has to transmit periodically to provide the BSS the information needed in order to estimate the location of the MS. If the MS has nothing to transmit, then a specific probe (e.g. Timing Advance Probe message) can be sent.

| ABBREVIATIONS OF THE APPLICATION TEXT | |
|---|---|
| ARQ: | Automatic Repeat on reQuest |
| BSS: | Base Station System |
| CA: | Capacity Allocation |
| CAA: | Capacity Allocation Acknowledgement |
| CC: | Capacity Change |
| CD: | Capacity Deallocation |
| CR: | Capacity Request |
| CRC: | Cyclic Redundancy Code |
| DNCCH: | Downlink Control Channel |
| DNC: | Downlink Control |
| FACCH: | Fast Associated Control Channel |
| FEC: | Forward Error Correction |
| FO: | Forward Order |
| FOCH: | Forward Order Channel |
| FOS: | Forward Order Schedule |
| GPRS: | General Packet Radio System |
| GSM: | Global System for Mobile Communications |
| L1: | Layer 1 |
| L2: | Link Layer |
| L3: | Network Layer |
| LLC: | Logical Link Control |
| MAC: | Media Access Control |
| MB: | Medium Bitrate |
| MS: | Mobile Station |
| NRT: | Near Real Time |
| PC: | Power Control |
| PDU: | Protocol Data Unit |
| PWCCH: | Public Power Control Channel |
| QoS: | Quality of Service |
| RID: | Reservation Identity |
| RLC: | Radio Link Control |
| RNL: | Radio Network Layer |
| RT: | Real Time |
| SDCCH: | Stand-alone Dedicated Control Channel |
| SDU: | Service Data Unit |
| TA: | Timing Advance |
| TAC: | Time Adjustment Correction |
| TAP: | Timing Advance Probe |
| TCH: | Traffic channel |
| TDMA: | Time Division Multiple Access |
| UNCCH: | NRT Control Channel for Uplink Traffic |

What is claimed is:

1. A method of controlling communication resources in a telecommunications system, in which the communication resources are divided into allocation periods, the allocation periods being further divisible into slots of at least two different sizes, a slot being the smallest allocable unit of communication resource, the method comprising steps:

dividing connections into at least two connection classes according to their transmission delay requirements, a first connection class for connections requiring relatively short transmission delay before a data packet is transmitted from the transmitting side and a second connection class for connections having less stringent requirements for transmission delay than what is required by said first connection class, storing and updating information concerning the current need for communication resources in each connection class, dynamically dividing the communication resources into slots according to the current need for communication resources, allocating circuit switched communication resources for connections in a first connection class, and allocating resources sufficient for transmitting a determined amount of data for each successive allocation period for connections belonging to said second connection class.

2. The method according to claim 1, wherein the resources are allocated independently of one another in different transmission directions.

3. The method according to claim 1 in a mobile telecommunications system comprising a base station subsystem and a plurality of mobile stations, wherein in response to a changed need for a connection having stringent requirements for minimal transmission delay from the mobile station to the base station subsystem, the mobile station sends the base station subsystem a capacity request message indicating the amount of resources needed, and in response to the request, the base station subsystem allocates the connection circuit-switched communication resources and informs the mobile station about the resources allocated by sending the mobile station a capacity allocation message indicating the resources allocated.

4. The method according to claim 1 in a mobile telecommunications system comprising a base station subsystem and a plurality of mobile stations, wherein in response to having determined a changed need for a connection having stringent requirements for minimal transmission delay from the base station subsystem to the mobile station, the base station subsystem allocates the connection circuit-switched communication resources and informs the mobile station about the resources allocated by sending the mobile station a capacity allocation message indicating the resources allocated.

5. The method according to claim 1, wherein the connections having less stringent requirements for transmission delay than in said first connection class are further divided into at least two subclasses having a high volume of data to be transmitted are allocated a reservation identity used when signaling allocation of communication resources for successive allocation periods.

6. The method according to claim 1 in a mobile telecommunications system comprising a base station subsystem and a plurality of mobile stations, wherein the connections having less stringent requirements for transmission delay than in said first connection class are further divided into at least two subclasses according to the amount of data to be transmitted, for the subclasses having high or low volumes to be transmitted, subclass specific resource allocation methods are used, in response to a need for a connection having less stringent requirements for transmission delay from the mobile station to the base station subsystem than in said first connection class, the mobile station sends the base station subsystem a capacity request message indicating the amount of resources needed, and in response to having received the request, the base station subsystem determines whether the connection belongs to the subclass having high volumes to be transmitted or to the subclass having low volumes to be transmitted, and in response to having determined that the connection belongs to the subclass having high volumes to be transmitted, the allocation method is used which is specified for the subclass of high volumes to be transmitted, and in response to determined that the connection belongs to the subclass having low volumes to be transmitted, the allocation method is used which is specified for the subclass of low volumes to be transmitted.

7. The method according to claim 6, wherein the allocation method specified for the subclass of high volumes to be transmitted is comprised of allocating a reservation identity to the connection, and informing the mobile station in an allocation message sent to the mobile station or the reservation identity allocated.

8. The method according to claim 6, wherein the allocation method specified for the subclass of low volumes to be transmitted is comprised of allocating to the connection resources sufficient to transfer a given amount of data and informing the mobile station in an allocation message sent to the mobile station of the resources allocated.

9. The method according to claim 1 in a mobile telecommunications system comprising a base station subsystem and a plurality of mobile stations, wherein the connections having less stringent requirements for transmission delay than in said first connection class are further divided into at least two subclasses according to the amount of data to be transmitted, for the subclasses having high or low volumes to be transmitted, subclass specific resource allocation methods are used, in response to having determined the need for a connection having less stringent requirements for transmission delay from the base station subsystem to the mobile station than in said first connection class, the base station subsystem determines whether the connection belongs to the subclass having high volumes to be transmitted or to the subclass having low volumes to be transmitted, and in response to having determined that the connection belongs to the subclass having high volumes to be transmitted, the allocation method is used which is specified for the subclass of high volumes to be transmitted, and in response to having determined that the connection belongs to the subclass having low volumes to be transmitted, the allocation method is used which is specified for the subclass of low volumes to be transmitted.

10. The method according to claim 9, wherein the allocation method specified for the subclass of high volumes to be transmitted is comprised of allocating a reservation identity to the connection and informing the mobile station in an allocation message sent to the mobile station of the reservation identity allocated.

11. The method according to claim 9, wherein the allocation method specified for the subclass of low volumes to be transmitted is comprised of allocating the connection resources sufficient to transfer a given amount of data and informing the mobile station in an allocation message sent to the mobile station of the resources allocated.

12. A method according to claim 1, further comprising the steps of:

negotiating a quality of service for a connection when a connection is established, and selecting a connection class for the established connection based on the negotiated quality of service.

13. A mobile telecommunications system comprising a base station subsystem and a plurality of mobile stations, in which system the communication resources are divided into allocation periods, the allocation periods being further divisible into slots of at least two different sizes, a slot being the smallest allocable unit of communication resource, the system comprising:

first connection dividing means for dividing the connections according to their transmission delay requirements into at least two connection classes, a first connection class for connections requiring relatively short transmission delay before a data packet is transmitted from the transmitting side and a second connection class for connections having less stringent requirements for transmission delay than what is required by said first connection class, determining means responsive to the first connection dividing means for determining the communication needs in different connection classes, resource dividing means responsive to the determining means for dividing the physical radio resources into slots based on the communication needs, and allocation means responsive to the determining means and the resource dividing means for allocating different types of channels for communications of different classes.

14. The mobile telecommunications system according to claim 13, further comprising a second connection divider responsive to the first connection divider for dividing the connections further into connection types according to the amount of data to be transmitted, and the communication need determining means being responsive to both the first and the second connection dividing means.

15. The mobile telecommunications system according to claim 13, the allocation means comprising means for allocating circuit-switched resources for connections requiring a short transmission delay and means for allocating for each successive allocation period to the other connections resources sufficient for transmitting a determined amount of data.

16. A base station subsystem for a mobile telecommunications system comprising a base station subsystem and a plurality of mobile stations, in which system the communication resources are divided into allocation periods, the allocation periods being further divisible into slots of at least two different sizes, a slot being the smallest allocable unit of communication resource, the base station subsystem comprising first connection dividing means for dividing the connections according to their transmission delay requirements into at least two connection classes, a first connection class for connections requiring relatively short transmission delay before a data packet is transmitted from the base station subsystem and a second connection class for connections having less stringent requirements for transmission delay than what is required by said first connection class, determining means responsive to the first connection dividing means for determining the communication needs in different connection classes, resource dividing means responsive to the determining means for dividing the physical radio resources into slots based on the communication needs, and allocation means responsive to the determining means and the resource dividing means for allocating different types of channels for communications of different classes.

17. The base station subsystem according to claim 16, the system further comprising a second connection divider responsive to the first connection divider for dividing the connections further into connection types according to the amount of data to be transmitted, and the communication need determining means being responsive to both the first and the second connection dividing means.

18. The base station subsystem according to claim 17, the allocation means comprising
  means for allocating circuit-switched resources for connections requiring a short transmission delay and means for allocating, for each successive allocation period, the other connection resources sufficient for transmitting a determined amount of data.

19. A base station controller for a mobile telecommunications system comprising
  a base station subsystem comprised of base stations and a base station controller controlling a plurality of base stations, and
  a plurality of mobile stations, whereby the communication resources of said telecommunications system are divided into allocation periods, the allocation periods being further divisible into slots of at least two different sizes, a slot being the smallest allocable unit of communication resource,
  the base station controller comprising
    first connection dividing means for dividing the connections according to their transmission delay requirements into at least two connection classes, a first connection class for connections requiring relatively short transmission delay before a data packet is transmitted from a base station of the base station subsystem and a second connection class for connections having less stringent requirements for transmission delay than what is required by said first connection class,
    determining means responsive to the first connection dividing means for determining the communication needs in different connection classes,
    resource dividing means responsive to the determining means for dividing the physical radio resources into slots based on the communication needs and
    allocation means responsive to the determining means and the resource dividing means for allocating different types of channels for communications of different classes.

20. The base station controller according to claim 19, wherein the system further comprises
  a second connection divider responsive to the first connection divider for dividing the connections further into connections types according to the amount of data to be transmitted and
  the communication need determining means are responsive to both the first and the second connection dividing means.

21. A base station controller according to claim 19, wherein the allocation means comprises
  means for allocating circuit-switched resources for connections requiring a short transmission delay and
  means for allocating for each successive allocation period to the other connection resources sufficient for transmitting a determined amount of data.

22. A mobile station for a mobile telecommunications system comprising a base station subsystem and a plurality of mobile stations, in which system the communication resources are divided into allocation periods, the allocation periods being further divisible into slots of at least two different sizes, a slot being the smallest allocable unit of communication resource,
  the mobile station comprising
    a first connection dividing means for dividing the connections according to their transmission delay requirements into at least two connection classes, a first connection class for connections requiring relatively short transmission delay before a data packet is transmitted from the mobile station and a second connection class for connections having less stringent requirements for transmission delay than what is required by said first connection class, and
    requesting means responsive to the first connection dividing means for requesting resources for different types of connections.

23. The mobile station according to claim 22, wherein the system further comprises
  a second connection divider responsible to the first connection divider for dividing the connections further into connection types according to the amount of data to be installed, and
  the communication need determining means are responsive to both the first and the second connection dividing means.

24. A method of controlling communication resources in a telecommunications system, in which the communication resources are divided into allocation periods, the allocation periods being further divisible into slots of at least two different sizes, a slot being the smallest allocable unit of communication resource, the method comprising steps:
  dividing connections into at least two connection classes according to their transmission delay requirements, at least a first connection class for real-time connections and at least a second connection class for non-real-time connections,
  storing and updating information concerning the current need for communication resources in each connection class,
  dynamically dividing the communication resources into slots according to the current need for communication resources,
  allocating circuit switched communication resources for connections in a first connection class, and
  allocating resources sufficient for transmitting a determined amount of data for each successive allocation period for connections belonging to said second connection class.

25. A method according to claim 24, further comprising the steps of:
  negotiating a quality of service for a connection when a connection is established, and
  selecting a connection class for the established connection based on the negotiated quality of service.

26. A method of controlling communication resources in a telecommunications system, in which the communication resources are divided into allocation periods, the allocation periods being further divisible into slots of at least two different sizes, a slot being the smallest allocable unit of communication resource, the method comprising steps:
  dividing connections into at least two connection classes according to their transmission delay requirements,
  storing and updating information concerning the current need for communication resources in each connection class,
  dynamically dividing the communication resources into slots according to the current need for communication resources,
  allocating using a circuit switched type allocating mechanism for a given connection of a first connection class at least one slot, and
  allocating slots sufficient for transmitting a determined amount of data in successive allocation periods for a given connection of a second connection class, the second connection class having no delay requirements or less stringent delay requirements than what is required by said first connection class, wherein said given connections of the first and the second connection classes use the respective allocated slots in their respective connections.

27. A method according to claim 26, further comprising the steps of:

negotiating a quality of service for a connection when a connection is established, and selecting a connection class for the established connection based on the negotiated quality of service.

28. A method of controlling communication resources in a telecommunications system, in which the communication resources are divided into allocation periods, the allocation periods being further divisible into slots of at least two different sizes, a slot being the smallest allocable unit of communication resource, the method comprising steps:

dividing connections into at least two connection classes according to their transmission delay requirements, a first connection class for connections requiring relatively short transmission delay before a data packet is transmitted from the transmitting side and a second connection class for connections having less stringent requirements for transmission delay than what is required by said first connection class, storing and updating information concerning the current need for communication resources in each connection class, dynamically dividing the communication resources into slots according to the current need for communication resources, allocating using a circuit switched type allocating mechanism for a given connection of the first connection class at least one slot, and allocating slots sufficient for transmitting a determined amount of data in successive allocation periods for a given connection of the second connection class, wherein said given connections of the first and the second connection classes use the respective allocated slots in their respective connections.

\* \* \* \* \*